United States Patent Office 3,846,110
Patented Nov. 5, 1974

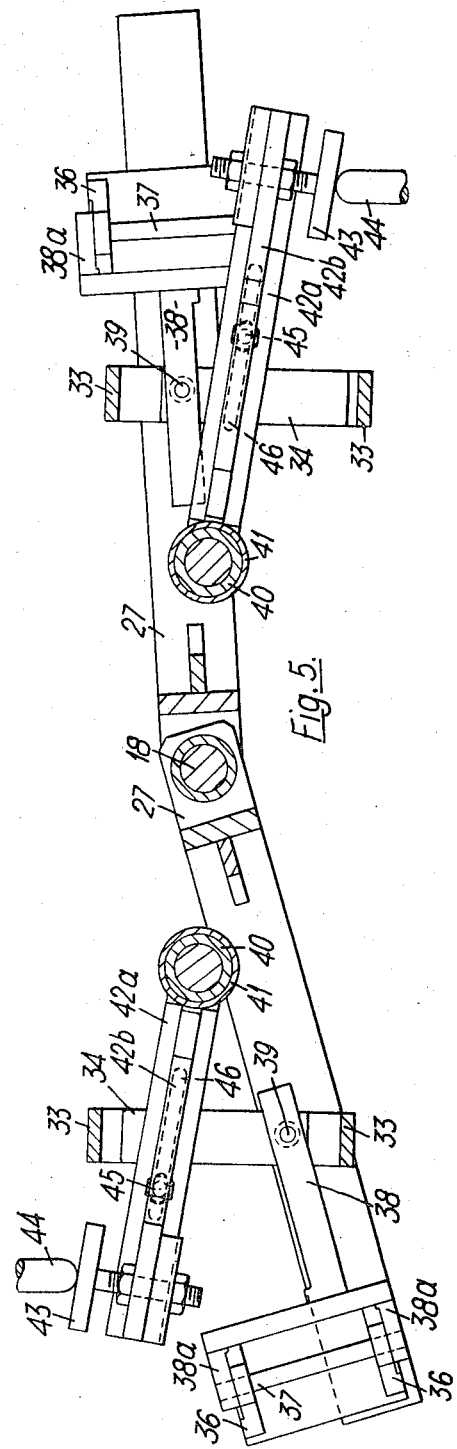

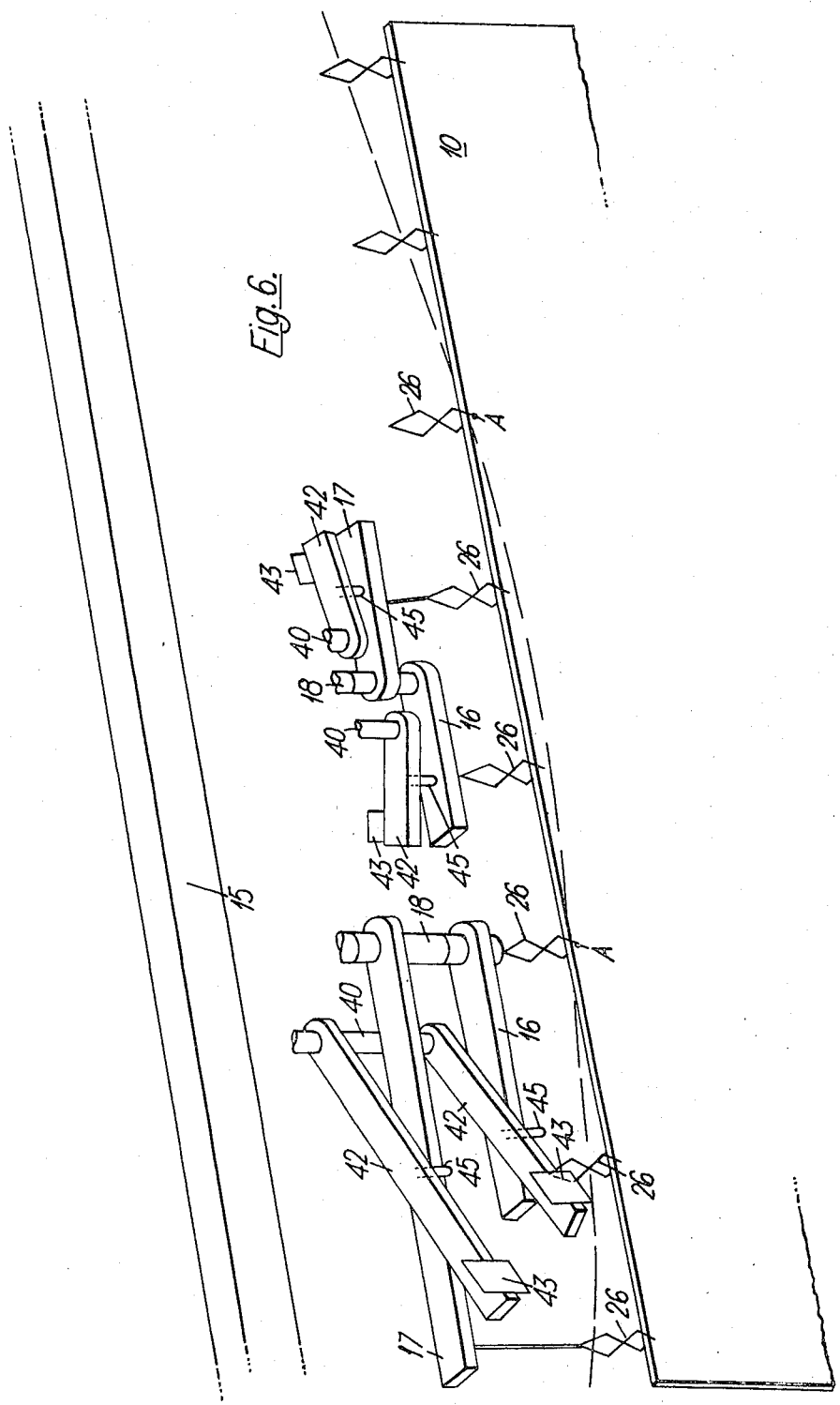

3,846,110
UNITS FOR SUSPENDING GLASS BETWEEN
OPPOSED BENDING DIES
Patrick Burns, Cheylesmore, England, assignor to Triplex
Safety Glass Company Limited, London, England
Filed Aug. 3, 1972, Ser. No. 277,524
Claims priority, application Great Britain, Aug. 11, 1971,
37,741/71
Int. Cl. C03b 23/02
U.S. Cl. 65—273                                14 Claims

ABSTRACT OF THE DISCLOSURE

A suspension unit for suspending a hot glass sheet to be bent between horizontally-movable bending dies, has horizontal arms from which tongs are suspended, and drive means operable by pushers on one or both of the bending dies, for swinging the tong-carrying arms through an angle such that the points of suspension of the tongs are always above the upper edge of the glass sheet as it is bent.

BACKGROUND OF THE INVENTION (1) Field of the invention

This invention relates to suspension units for suspending glass sheets in preparation for and during a bending operation. The invention also relates to apparatus employing these suspension units for bending hot glass sheets.

(2) Description of the prior art

In the bending of a vertically suspended glass sheet, the glass sheet is usually suspended when cold from sets of tongs and heated in a furnace to a temperature above the strain point and near to the softening point of the glass. The suspended hot glass sheet is transferred on the tongs to a position between the complementary bending dies, such that the central area of the glass sheet is closely adjacent the apex of the convex die and the outer extremities of the concave die. With the hot glass sheet in mid-position, the respective faces of the dies will contact the glass sheet simultaneously and the glass sheet will not be moved from its initial position when the dies are closed in the bending operation.

When suspending a small glass sheet it is only necessary to use two tongs, and these can be positioned on the glass sheet at the points where no lateral movement of the glass sheet takes place during bending. These two stationary points are chosen to lie at the intersections of the line representing the glass sheet prior to bending with the line representing the final curvature of the glass sheet. However, when a large glass sheet is suspended it is essential to use more than two tongs and these cannot be so conveniently placed. By suspending the tongs from separate arms each of which is freely pivoted about a vertical axis passing through one of the median points, free movement of the tongs with the glass sheet during bending can be permitted. This movement is achieved by the hot glass pulling the tongs into their new position, and to allow for this the tong bars must rotate easily. Even with a free movement of the tong bars, the upper edge of the hot glass sheet is subjected to a twisting action and may thereby be pulled slightly out of shape. In addition the tongs may move out of their correct position during subsequent transfer of the curved glass sheet after bending, for example for annealing or toughening.

In a known arrangement for suspending glass sheets prior to bending, a plurality of tongs are suspended from a tong bar made up of a series of linked sections, means being provided for moving the sections to take up approximately the shape of the curved glass sheet. The sections of the tong bar are progressively moved from their initial in-line position to the curved position as bending proceeds, by a bar attached to one of the bending dies which pushes on a lever mechanism located at the centre of the suspension system. There is no provision for the adjustment of the tongs to suit different curvatures of glass sheet, or different degrees of die movement. It is thus not possible to provide for any curvature of the glass sheet other than a curvature which is relatively simple or which corresponds with the fixed length of the linked sections of the tong bar, when in their final position.

Another known arrangement involves a complex system of tong bars from which are suspended tongs which are free to rotate about vertical axes. The point of suspension of this tong bar system is arranged to lie in a vertical plane perpendicular to the direction of the die movement and which contains the centre of gravity of the sheet after it has been bent. The movement of this tong bar system is achieved entirely by the movement of the glass sheet. Consequently the upper edge of the glass sheet may be subjected to a twisting action and can be pulled out of shape.

A main object of this invention is to provide a suspension system which overcomes these disadvantages and is, for example, of particular advantage in a process for bending very thin glass sheets to complex curvatures, wherein any slight pull on the upper edge of the hot glass sheet will easily distort the edge.

SUMMARY

A suspension unit for suspending a hot glass sheet during bending of the glass sheet between a pair of horizontally acting bending dies, has one or more generally horizontal arms for carrying a tong or tongs to grip the upper edge of the glass sheet to be bent. For each arm there is drive means for swinging the arm about a vertical axis in response to movement of one of the bending dies as the bending dies bend the glass sheet. The drive means effects a predetermined displacement of the tong carrying arm which is different from the displacement of said one bending die, so that the tongs are always maintained above the upper edge of the glass sheet as it is bent.

By these means, a form of lost motion is introduced into the tong displacement relative to the die displacement. Preferably the drive means includes means for engagement by pusher means on at least one of the bending dies and adjustable means for effecting a displacement of the tong carrying arm just sufficient to maintain a tong carried thereby above the upper edge of the glass sheet throughout the bending operation. On completion of the bending operation, the tong is vertical, and thus distortion of the upper edge of the glass sheet is prevented when the dies open.

BRIEF DESCRIPTION OF THE DRAWINGS

FIG. 5 is a plan view of the lower part of the unit of FIGS. 3 and 4, lying generally below the line V—V of FIG. 3, and FIG. 6 is a diagrammatic view of another form of suspension unit according to the invention.

DESCRIPTION OF THE PREFERRED EMBODIMENTS

Figure 1:
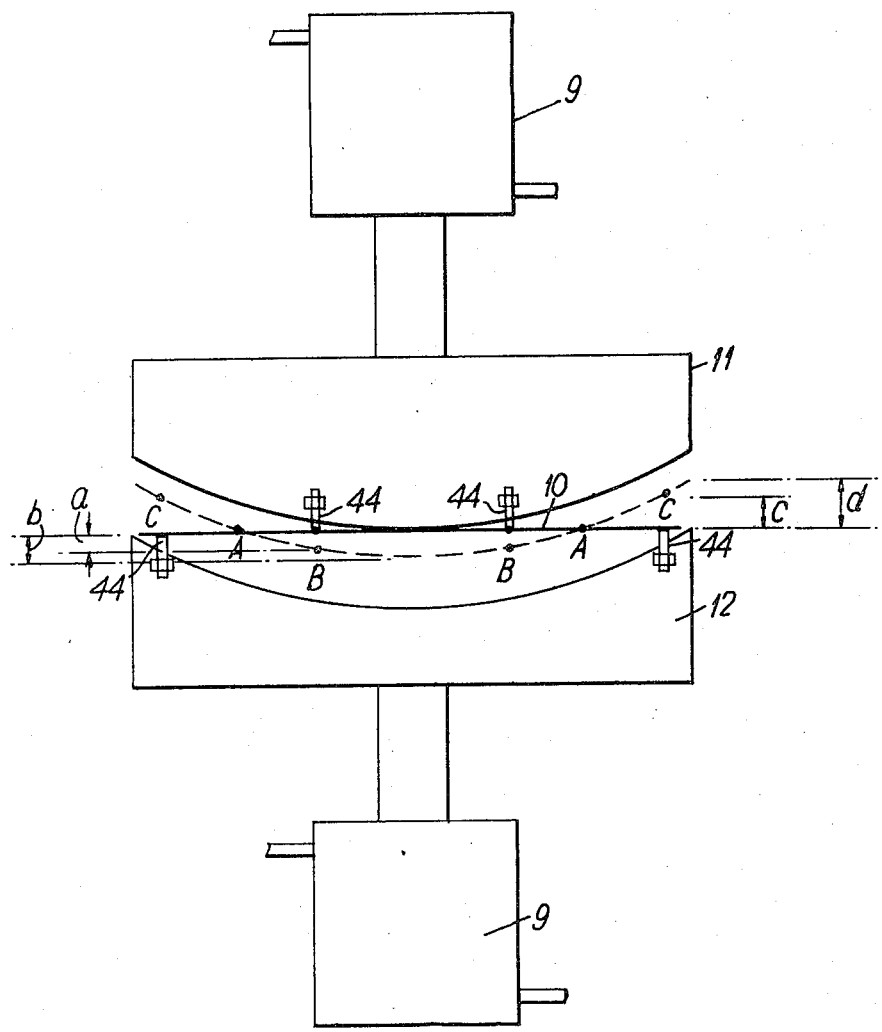
FIG. 1 is a diagrammatic representation, in plan, of the positions of a flat glass sheet before and after it is bent between a pair of horizontally acting bending dies, the figure indicating the points of suspension of the glass sheet.

This example relates to the manufacture of a curved glass sheet employing a pair of complementary, horizontally-acting bending dies having the desired curvature. A flat glass sheet 10 is suspended cold from tongs and then heated in a furnace to a temperature within the bending temperature range of the glass. The hot flat glass sheet is transferred, suspended from the tongs to a position between complementary convex and concave bending dies 11, 12, as shown in FIG. 1, in close proximity with the apex of the convex die 11 and the vertical outer edges of the concave die 12. The bending dies are moved towards each other, in known manner, by synchronised hydraulic cylinders 9 to engage the opposite major surfaces of the glass sheet thereby forming the glass sheet to the desired curvature.

In FIG. 1, there is shown in full lines the position of the flat glass sheet 10 just before being bent by the bending dies 11, 12, and in dash lines the position of the curved glass sheet on completion of the bending operation. These lines intersect at two stationary points A where no lateral movement of the glass sheet takes place during bending. On each side of each point A further points B and C are indicated, these six points A, B and C being the points of suspension of the glass sheet.

A main purpose of this invention is to provide a pair of suspension units which allows the glass sheet to be suspended by six tongs, one tong being at each of the six points A, B, C. During subsequent bending, the points A remain stationary, whilst the points B, C move different linear distances in opposite directions. To avoid twisting the upper edge of the glass sheet it is important that the tongs should be moved positively and pusher means are provided attached to the dies. It will be seen from FIG. 1, that the linear distance $a$ moved by the point B is less than the linear distance $b$ moved by an equivalent point on the surface of the convex die 11, and that the linear distance $c$ moved by the point C is less than the linear distance $d$ moved by an equivalent point on the surface of the concave die 12.

Figure 2:
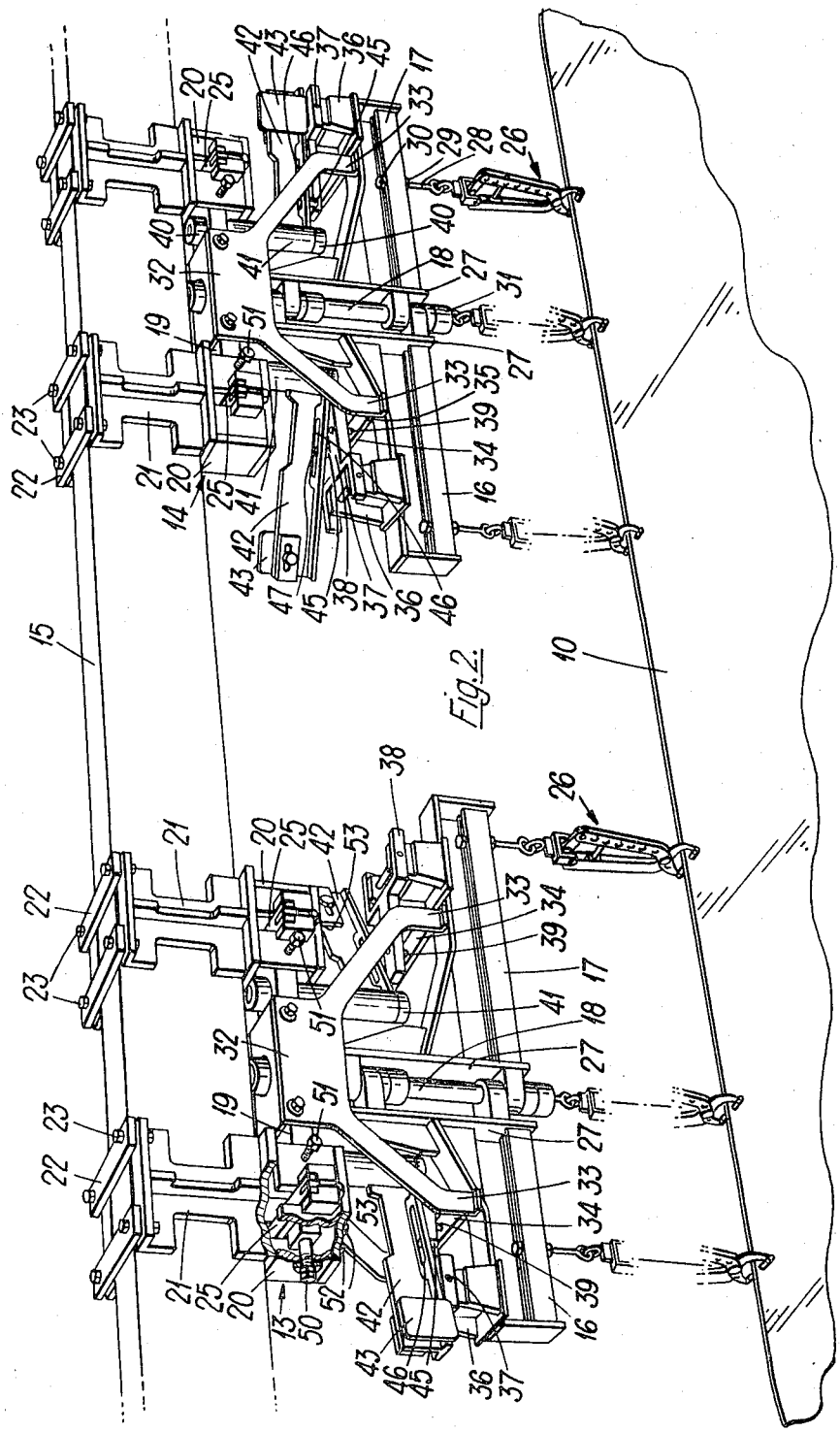
FIG. 2 is a perspective view, part cut-away, of a pair of suspension units according to the invention for suspending a glass sheet between the bending dies shown in FIG. 1.
Figure 3:
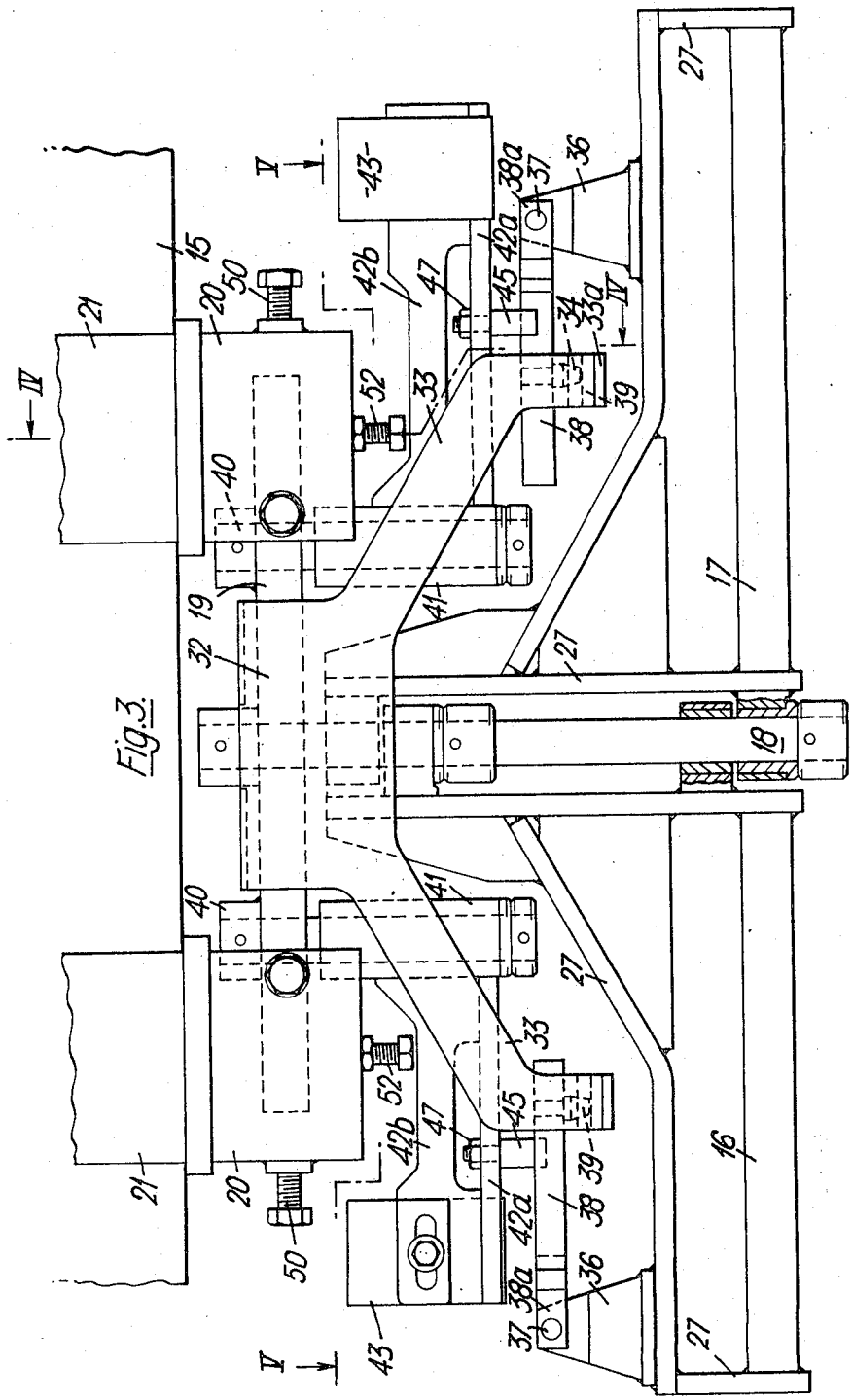
FIG. 3 is a front elevation, partly in section, of one of the suspension units of FIG. 2.
Figure 4:
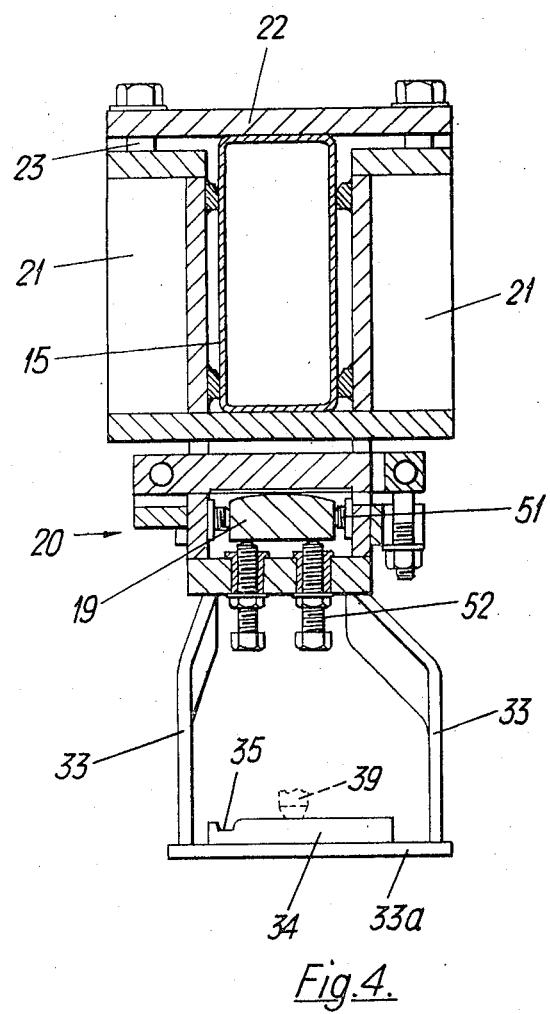
FIG. 4 is a sectional view on line IV—IV of FIG. 3 with some elements omitted for the sake of clarity.

Tong suspension units according to the invention which achieve the desired result will now be described. As shown in FIG. 2, a pair of suspension units 13, 14 depend from a primary tong bar 15. Each unit is substantially identical and one of the units is illustrated in greater detail in FIGS. 3, 4 and 5.

Each unit comprises a pair of horizontal tong carrying arms 16, 17 pivotally mounted on a vertical spindle 18 which is attached at its upper end to a horizontal secondary tong bar 19. Each end of the secondary tong bar 19 is located in a housing 20, which housings are rigidly attached to the primary tong bar 15 by means of brackets 21 upstanding from the housings 20 and interconnected above the primary tong bar 15 by straps 22 and bolts 23. Horizontal and vertical adjustment of each secondary tong bar 19 in its housings 20 is provided by set screws 50, 51, 52 which act on the ends, sides and undersurface respectively of each secondary tong bar, to provide limited relative adjustment between the tong carrying arms 16, 17 and the primary tong bar 15 for correctly aligning the tong carrying arms with the upper edge of the glass sheet 10 with the axes of the vertical spindles 18 passing through the respective stationary points A of the glass sheet.

When correctly aligned, the secondary tong bar 19 of each unit 13, 14 is locked in position by clamping blocks 25 which are pivotally mounted on one side of the respective secondary tong bar and held by set screws 53 on the other side of the secondary tong bar.

The glass sheet 10 is suspended from the spindles 18 and the arms 16, 17 by six tongs 26 with one tong suspended from each spindle 18 and one tong suspended from each arm 16, 17. The positions of the tongs on the arms 16, 17 are chosen in dependence on the weight of the glass sheet and the curvature which it is intended to impart to the glass sheet.

Each arm 16, 17 is formed from two parallel bars which provide therebetween a vertical channel and each pair of parallel bars is mounted on the vertical spindle 18 by a huge bracket 27.

Each of the tongs 26 which is suspended from one of the arms 16, 17 is suspended by means of a free link suspension from the lower end of a threaded rod 28 which is inserted through the gap between the parallel bars of the respective tong carrying arm 16 or 17. Each of the rods 28 is held in a chosen position in the gap by a pad 29 and nut 30.

The central tongs 26 of each set of three tongs are respectively suspended by free link suspensions from the lower ends 31 of the spindles 18, and these central tongs hang directly above the respective median points A.

Rigidly attached to the secondary tong bar 19 of each unit is a sub-frame 32, which consists of two pairs of opposed legs 33 projecting downwardly towards the tong carrying arms 16, 17 to terminate above each arm. Between the ends of each pair of legs 33 is fixed a holding plate 33a which carries a location block 34 which has at one end a recess 35 formed in its upper surface, see FIG. 4.

Mounted on the upper face of each tong carrying arm 16, 17 is a U-shaped bracket 36 having a pivot pin 37 inserted between the upper ends of the legs of the bracket. Attached to this pivot pin 37, by a pair of arms 38a which straddle the bracket 36, is a latch arm 38 having at its free end a downwardly extending latch locating pin 39, FIG. 3. Each latch arm 38 extends between the adjacent pair of legs of the sub-frame 32 and the latch pin 39 rests on the upper surface of the location block 34.

On each side of the central portion of the sub-frame 32 and rigidly attached to the secondary tong bar 19, are a pair of vertical pillars 40 which extend downwardly between the respective legs 33 of the sub-frame towards the upper faces of the tong carrying arms 16, 17. Pivoting on each pillar 40 is a sleeve 41 to which is attached a respective drive arm 42 of inverted T-section each comprising a horizontal base plate 42a and a vertical web 42b. These drive arms 42 lie horizontally immediately above the respective tong carrying arms 16, 17. At the free end of each drive arm 42 is attached an adjustable pad 43 which is arranged to be engaged by a corresponding pusher 44, see FIGS. 1 and 5, attached to the upper surface of one of the bending dies 11, 12. In the base plate 42a of each drive arm 42 intermediate its ends there is cut a longitudinal slot 46 which is open in the vertical plane. Inserted in the slot is a driving pin 45 which extends vertically downwardly and can be locked in any position along the length of the slot by a nut 47. The vertical extent of the driving pin 45 is such that it can strike a central part of the latch arm 38 when the drive arm 42 is actuated by the respective pusher 44.

With the two tong carrying arms 16, 17 arranged in line and each of the tongs 26 hanging freely the flat glass sheet 10 is loaded into the jaws of the tongs. The glass sheet is passed into a furnace where the glass sheet is heated to the required bending temperature. When the glass sheet has been heated to bending temperature, it is advanced between the complementary bending dies 11, 12 and held stationary. The bending dies are actuated to close onto the glass sheet, and each of the pushers 44 mounted on the respective dies contact the respective pads 43 on the drive arms 42. The drive arms begin to rotate about the pillars 40 mounted on the secondary tong bar 19 and the driving pins 45 contact the latch arms 38.

Movement of the latch arms causes a horizontal swinging movement of the tong carrying arms 16, 17 about the central spindle 18 and moves each tong 26 through a distance corresponding to the bending movement of the part of the hot glass sheet engaged by the tong.

The extent of movement of each tong carrying arm 16, 17 relative to the dies 11 and 12 is set by setting the location of the driving pins 45 in their slots 46. Each tong thereby remains vertical directly above the glass sheet throughout the bending operation.

As each driving pin 45 pushes the respective latch arm 38, the latch pin 39 slides along the location block 34 towards the recess 35 at the end of the location block. At the instant when the dies 11, 12 are fully closed onto the hot glass sheet 10, the latch pin 39 drops into the recess 35 and becomes locked, so locking the tong carrying arm in its final position. With the hot glass sheet curved and the tong carrying arms 16, 17 locked, the complementary bending dies 11, 12 are retracted from the surfaces of the glass sheet 10 and returned to their initial positions. The curved glass sheet remains suspended therebetween and is then transferred to the next stage in the process which may be toughening or annealing.

The locking of the tong suspension mechanism prevents movement of the tong carrying arms and thereby prevents twisting of the hot curved glass sheet as it swings slightly during transfer to this next stage, e.g. to an annealing or toughening station.

When all the subsequent processes are completed the glass sheet is removed from the tongs 26, and the latch arms 38 are lifted to unlock the tong carrying arms 16, 17 which are then returned to their initial positions for loading with a further cold flat glass sheet 10.

A further advantage of the above construction of suspension unit is the ease of aligning the tong carrying arms with the upper edge of the glass sheet. As stated above, this adjustment is effected by the set-screws 50, 51, 52 in the housings 20 moving the secondary tong bar 19 as required. However, it is to be appreciated that adjustment of these set screws not only moves the tong carrying arms but all the other parts of the unit together.

Each of the suspension units may only carry one or two tongs in particular applications. Further a single suspension unit comprising two or three tongs may be used for suspending a small glass sheet to be bent.

If desired, three suspension units may be provided for suspending a single large glass sheet, the units being disposed at spaced positions along the upper edge of the glass sheet. The end units would be the same as the pair of units shown in FIG. 2, and the intermediate unit would be similar except that it would not have a centre tong 26 hanging from its spindle 18.

Another arrangement of suspension units according to the invention for suspending a large flat glass sheet to be bent is illustrated in FIG. 6.

The suspension unit which carries tongs for engaging the left-hand end of the glass sheet 10, as shown in FIG. 6 has a spindle 18 located above the point A on the sheet which is stationary during bending and a tong 26 suspended from the bottom of the spindle 18 grips the sheet at point A.

The tong carrying arm 16 is pivotally mounted on the spindle 18 in the same way as illustrated in FIG. 2 to 5, and the tong carrying arm 17 is a longer arm pivotally mounted on spindle 18 above the arm 16 and extending parallel to the arm 16 on the same side of the spindle. The arms 16 and 17 carry tongs 26 for gripping the upper margin of the glass sheet at locations spaced apart between the stationary point A and the side of the sheet.

A fixed pivot pillar 40 is spaced from the spindle 18 and carries two drive arms 42 having driving pins 45 for engaging the tong carrying arms 16 and 17. The two drive arms 42 both extend on the same side of the pillar 40 as shown and carry pads 43 both facing towards the concave die 12 for engagement by pushers 44 on that die.

The centre of the sheet is suspended from a unit similar to that of FIGS. 2 to 5 but without a central tong suspended from its spindle 18, and with the tong carrying arm 17 mounted on the spindle 18 at a level higher than the level of the arm 16. The drive arms 42 carry pads 43 both facing towards the convex die 11 to be engaged by pushers 44 on that die.

Both tongs 26 suspended from the central unit move in the same direction as the sheet is bent, and in this manner of suspension all four tongs suspended from the arms 16 and 17 of the outer units move in the same direction, opposite to the direction of movement of the central tongs, as the sheet is bent.

I claim:

1. A suspension unit for suspending a hot glass sheet during bending of the glass sheet between a pair horizontally acting bending dies, comprising a plurality of generally horizontal tong carrying arms each pivoted about a fixed vertical axis and a tong set carried by each arm at a point thereon spaced from the associated pivot axis, each arm being independently movable about its axis from an initial position of the glass sheet to a final bent position of the glass sheet between which positions said arms are swept through selected arcs, and a drive means for swinging each tong carrying arm about its associated pivot axis in response to movement of the bending dies as the bending dies bend the glass sheet, each said drive means engaging its associated tong carrying arm at a predetermined distance from said associated pivot axis to swing the arm through that arc necessary to maintain the tong set carried by such tong carrying arm above the upper edge of the glass sheet at it is bent.

2. A unit according to claim 1, wherein said drive means includes a drive arm mounted for pivotal movement about a second vertical axis spaced from the vertical axis of the tong carrying arm, said drive arm having means for engagement by a pusher attached to one of the bending dies, and adjustable means for transmitting movement of the drive arm to the associated tong carrying arm.

3. A unit according to claim 2, wherein said adjustable means comprises a driving member attached to the drive arm and arranged to engage the tong carrying arm to transmit movement thereto, and an adjustable mounting for the driving member on the drive arm whereby the driving member is adjustable to engage the tong carrying arm at a predetermined distance from said first axis.

4. A unit according to claim 3, including detent means for locking the tong carrying arm in position at the end of said predetermined displacement.

5. Apparatus for bending a hot glass sheet, comprising a series of suspension units according to claim 1, tongs carried by the units for suspending a glass sheet, a pair of horizontally acting bending dies spaced apart to receive the suspended glass sheet therebetween, means for moving the bending dies towards each other to bend the glass sheet, and pusher means mounted on at least one of the bending dies to engage said drive means and effect the required displacement of each tong in order to maintain each tong above the upper edge of the glass sheet throughout the bending operation.

6. A unit according to claim 1, wherein said plurality of horizontal arms includes at least one pair of arms pivoted independently about the same fixed vertical axis.

7. A unit according to claim 6, wherein the tong carrying arms are mounted for generally horizontal swinging movement on opposite sides of a commonly upstanding spindle, the drive means for one arm includes means for engagement by pusher means on one of the bending dies, and the drive means for the other arm includes means for engagement by pusher means on the other bending die.

8. A unit according to claim 7, wherein a tong is suspended from the bottom of the spindle.

9. A unit according to claim 7, including detent means for locking both tong carrying arms in a position at the end of their respective predetermined displacements.

10. A unit according to claim 6, wherein the tong carrying arms are both mounted for generally horizontal swinging movement on the same side of a common upstanding spindle, and the drive means for both arms includes means for engagement by pusher means on one only of the bending dies.

11. A suspension unit for suspending a hot glass sheet during bending of the glass sheet between a pair of horizontally acting bending dies, comprising a horizontal arm for carrying a tong to grip the upper edge of a glass sheet, drive means for swinging said arm about a vertical axis, in response to movement of one of the bending dies as they close on to the sheet, through a predetermined angle which maintains a tong carried by that arm above the upper edge of the glass sheet as it is bent, and detent means for locking the tong carrying arm in position at the end of said predetermined angular displacement.

12. A suspension unit for suspending a hot glass sheet during bending of the glass sheet between a pair of horizontally acting bending dies, comprising a pair of horizontal arms each for carrying a tong to grip the upper edge of a glass sheet, drive means for swinging said arms about a common vertical axis, in response to movement of the bending dies as they close on to the sheet, through predetermined angles which maintain tongs carried by the arms above the upper edge of the glass sheet as it is bent, and detent means for locking both said tong carrying arms in position at the end of their respective predetermined angular displacements.

13. In a glass bending station having a pair of horizontally opposed bending dies each movable through a selected distance between an open condition and fully closed condition and including a overhead support means for suspending an initially flat heated glass sheet between the dies so as to be bent thereby into curved shape, the improvement wherein:

said support means includes a plurality of horizontal arms each pivoted about a fixed vertical axis and each independently movable about its axis from an initial position of the glass sheet to a final bent position of the glass sheet in which said arms are swept through selected arcs;

a tong set carried by each arm at a point thereon spaced from the associated pivot axis whereby each tong set is translated a particular distance parallel to the path of die movement by an amount determined by the arc swept by the arm and the displacement of the tong set from the pivot axis; and drive means for pivoting said arms from the initial to the final positions as the die members are moved from said open to said fully closed conditions, said drive means including motion-transmitting members carried by said dies correspondingly to be moved through said selected distances as said dies are moved from said open to said fully closed conditions and means engaged by said motion-transmitting members throughout such movements of the dies simultaneously to swing said arms through said selected arcs, the means last mentioned including mechanism for selectively adjusting said selected arcs to translate said tong sets by amounts such that said particular distances are different form said selected distances.

14. In a glass bending station as defined in claim 13 including means for latching each arm in its final position.

References Cited
UNITED STATES PATENTS

| | | | |
|---|---|---|---|
| 2,250,628 | 7/1941 | Forbes | 65—106 |
| 2,251,159 | 7/1941 | Owen | 65—273 X |

FOREIGN PATENTS

| | | | |
|---|---|---|---|
| 496,435 | 12/1950 | Belgium | 65—289 |

ARTHUR D. KELLOGG, Primary Examiner

U.S. Cl. X.R.

65—275, 289